(12) United States Patent
Lizarralde Dorronsoro et al.

(10) Patent No.: US 8,408,266 B2
(45) Date of Patent: Apr. 2, 2013

(54) HEAD FOR THE AUTOMATIC POSITIONING OF FIBRE BLANKETS

(75) Inventors: Rafael Lizarralde Dorronsoro, Oñati (ES); Miguel Maria Zatarain Gordoa, San Sebastian (ES)

(73) Assignee: Ideko S. Coop., Elgoibar (Guipuzcoa) (ES)

( * ) Notice: Subject to any disclaimer, the term of this patent is extended or adjusted under 35 U.S.C. 154(b) by 197 days.

(21) Appl. No.: 12/921,831

(22) PCT Filed: Feb. 23, 2009

(86) PCT No.: PCT/ES2009/000096
§ 371 (c)(1),
(2), (4) Date: Sep. 23, 2010

(87) PCT Pub. No.: WO2009/112604
PCT Pub. Date: Sep. 17, 2009

(65) Prior Publication Data
US 2011/0005456 A1 Jan. 13, 2011

(30) Foreign Application Priority Data

Mar. 12, 2008 (ES) .................................. 200800721

(51) Int. Cl.
*B29C 65/00* (2006.01)
*B32B 37/00* (2006.01)
*B32B 38/04* (2006.01)
*B32B 38/10* (2006.01)

(52) U.S. Cl. ........ 156/525; 156/526; 156/531; 156/468; 156/486; 156/575; 156/578; 118/40; 118/313

(58) Field of Classification Search .................. 156/525, 156/526, 531, 468, 486, 575, 578; 118/40, 118/313; 242/564
See application file for complete search history.

(56) References Cited

U.S. PATENT DOCUMENTS

| | | | | | |
|---|---|---|---|---|---|
| 3,717,536 | A | * | 2/1973 | McVay et al. | 156/463 |
| 4,068,619 | A | * | 1/1978 | Batts | 118/122 |
| 4,239,580 | A | * | 12/1980 | Ives | 156/468 |
| 4,985,105 | A | * | 1/1991 | Masuda | 156/261 |
| 7,063,118 | B2 | * | 6/2006 | Hauber et al. | 156/486 |

* cited by examiner

*Primary Examiner* — Linda L Gray
(74) *Attorney, Agent, or Firm* — Nath, Goldberg & Meyer; Jerald L. Meyer; Scott C. Langford

(57) ABSTRACT

Head for the automatic positioning of fiber blankets, which determines a path for the fiber blanket (2) to be positioned, as far as a positioning zone (5), passing via a resin-impregnation zone (4) and via a cutting zone (3), including, in front of and behind said zones (3 and 4) individual sets of rollers (6-7) that convey the fiber blanket (2) and control the tension thereof.

8 Claims, 5 Drawing Sheets

HEAD FOR THE AUTOMATIC POSITIONING OF FIBRE BLANKETS

This is a National Phase Application filed under 35 U.S.C. 371 as a national stage of PCT/ES2009/000096, with the filing date of Feb. 23, 2009, an application claiming the benefit to the Spanish Application No. P200800721, filed on Mar. 12, 2008, the content of each of which is hereby incorporated by reference in its entirety.

FIELD OF THE ART

The present invention relates to the installations and processes which allow constructing all types of parts and preferably large structural parts by means of the application of successive fibre blankets, which are deposited one on top of the other until reaching the required thickness. The invention proposes a head for the automatic positioning of such fibre blankets, overcoming the drawbacks of conventional solutions which used basically manual processes.

STATE OF THE ART

In different fields, such as the construction field, large prefabricated structural parts are used, which are conventionally constructed from reinforced concrete, prestressed concrete, steel and/or the like, said parts thus having a weight which makes the transport and handling thereof complicated.

Therefore, materials of another type have started to be used in the construction of these prefabricated structures, as is the case of fibre and resin composites, resulting in parts with a lower weight and more manageable than those made of concrete and steel.

However, the use of materials of this type in the construction of prefabricated structures lacks sufficient means for making quality parts, the application processes being basically manual, so uniformity in the design features of the parts which are manufactured cannot be assured in the results.

OBJECT OF THE INVENTION

According to the present invention, a head for the automatic positioning of fibre blankets on large surfaces is described, this head being able to be used for the manufacture of both large structural parts and of parts of any other type, although it is in the former in which the head provides greater advantages in its use. This automatic positioning is truly advantageous compared to conventional manual solutions, both due to the greater simplicity and quickness in the manufacture and due to the quality of the finishes and the uniformity of the parts thus obtained.

The head object of the present invention has three differentiated zones; a cutting zone, an impregnation zone and a positioning zone for the fibre blankets. The head automatically applies said fibre blankets on the corresponding moulds or mandrels, assuring the quality and the uniformity of the parts obtained. Furthermore, this is achieved with a repetitive process which is much quicker and simpler than the manual processes known up until now.

The fibre blanket is supplied from the corresponding reel and for its correct entrance in the head, the latter incorporates a mouth structure arranging the blanket in the inlet of an upper set of rollers which pull on it, making it pass towards the cutting and impregnation zone. From this zone the blanket passes to another lower set of rollers, which are located after this cutting and impregnation zone. This second set of rollers maintains the fibre blanket with the suitable working tension.

In the impregnation zone, the head incorporates pressurized spraying nozzles for impregnating resin in the fibre blanket.

In the cutting zone there is arranged a cutting tool, such as for example an alternating or rotating blade system, an ultrasound cutting system or a similar solution, which cuts the blanket in a transverse direction.

Once the fibre blanket has been impregnated, it passes via the lower set of rollers until reaching the positioning zone, which consists of at least one pressure roller. According to a possible practical embodiment, it has been envisaged that there are two pressure rollers assembled in a rocker; such that, depending on the position occupied by this rocker, one or the other of these two rollers acts. Thus, when the head moves in the advance direction, one of the rollers acts and, upon moving backwards, the other one acts, allowing the positioning of the fibre blanket both in the advance and in the retreat of the head. The change from one roller to the other takes place automatically, without needing an intervention of the operator.

The reel for feeding the fibre blanket is arranged in the corresponding reel-holder, which incorporates a controller for regulating the unwinding speed.

With this head object of the invention, parts can therefore be formed automatically from fibre blankets, allowing making use of the lightweight and strength features of said material. Furthermore, structural parts with large dimensions can be manufactured by means of this head, thus obtaining the advantages in terms of transport and handling offered by the structural parts thus formed.

DETAILED DESCRIPTION OF THE INVENTION

Figure 1:
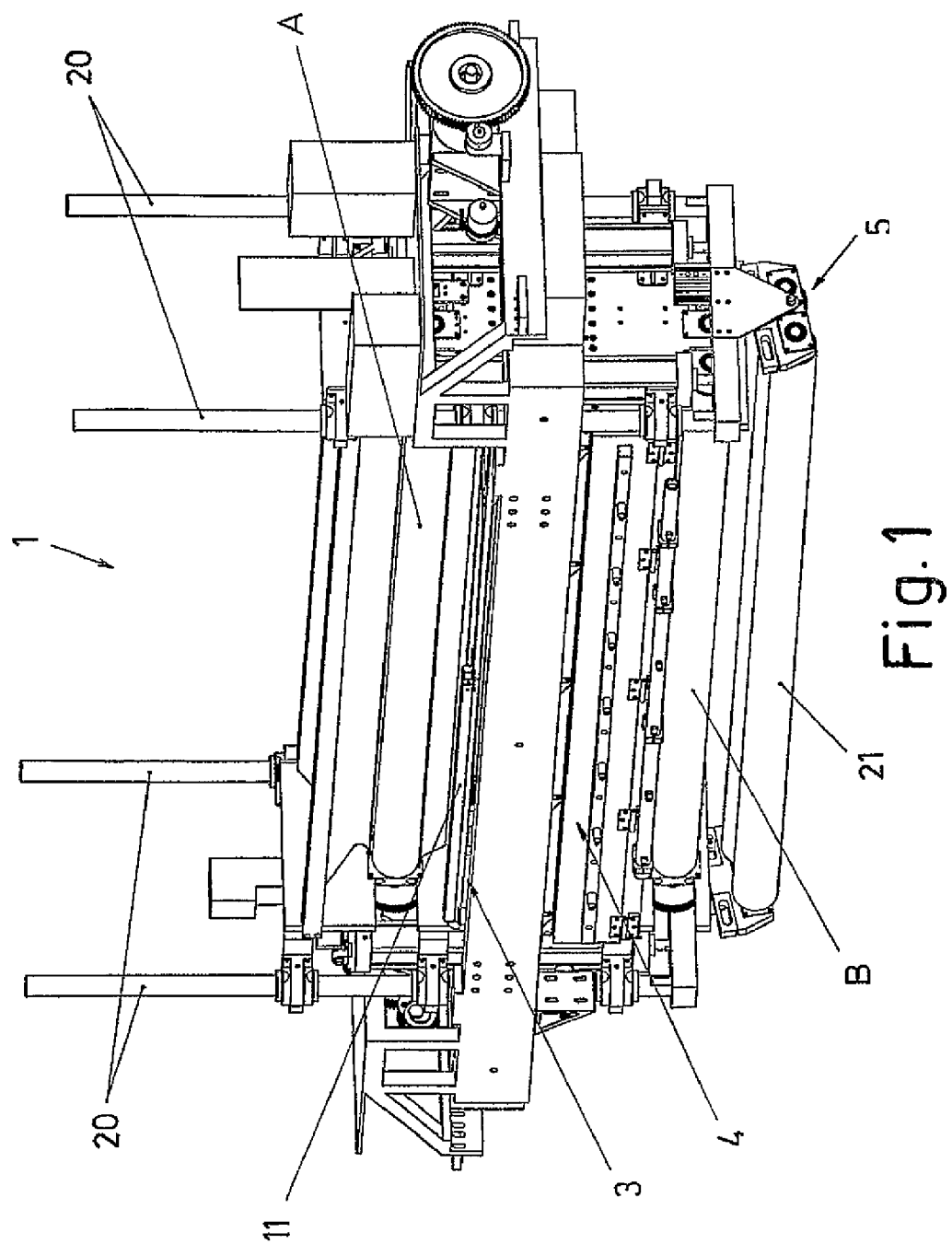
FIG. 1 shows a perspective view of the head for the automatic positioning of fibre blankets object of the invention.
Figure 2:
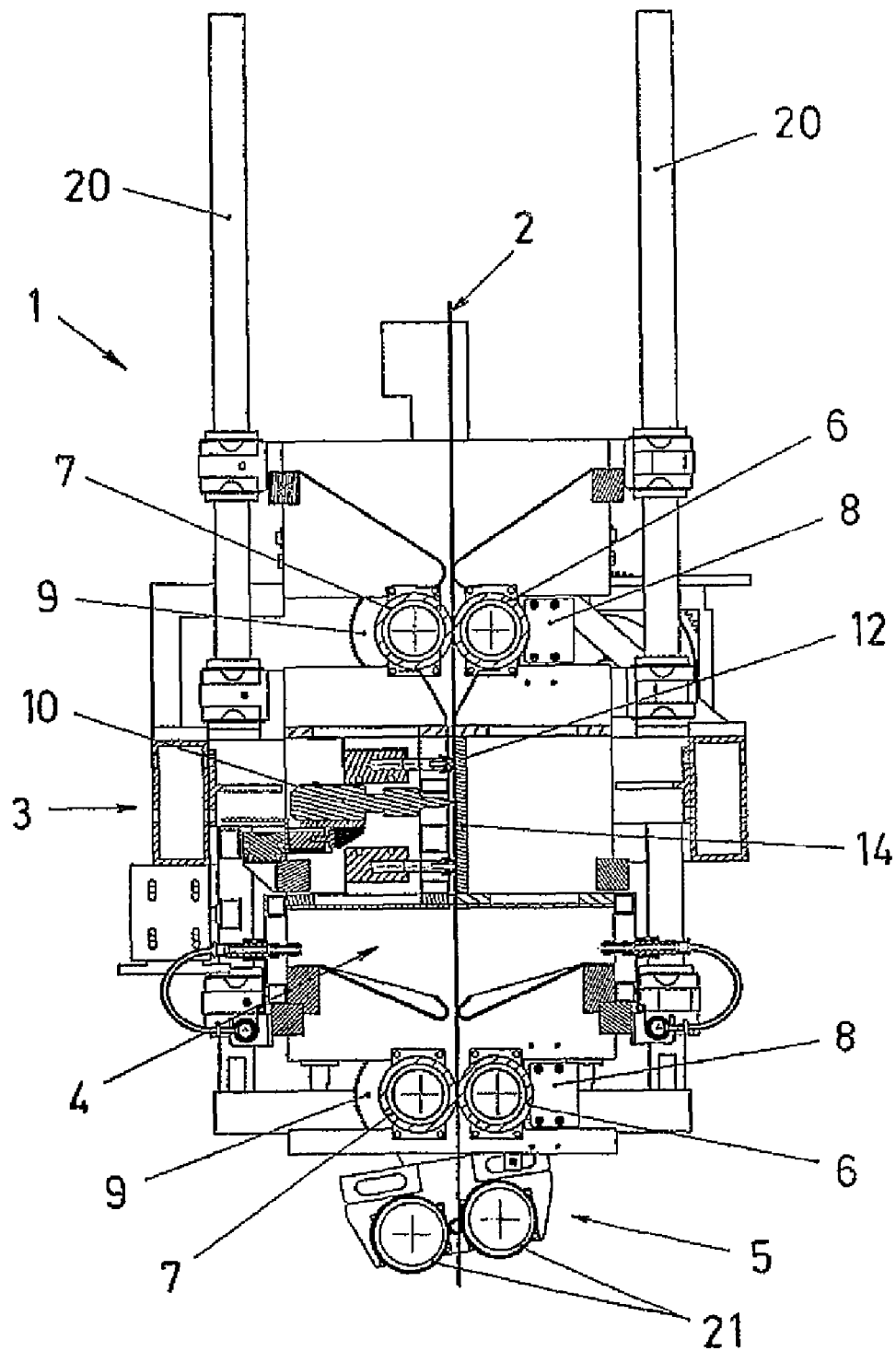
FIG. 2 shows a cross section of the head object of the invention.
Figure 3:
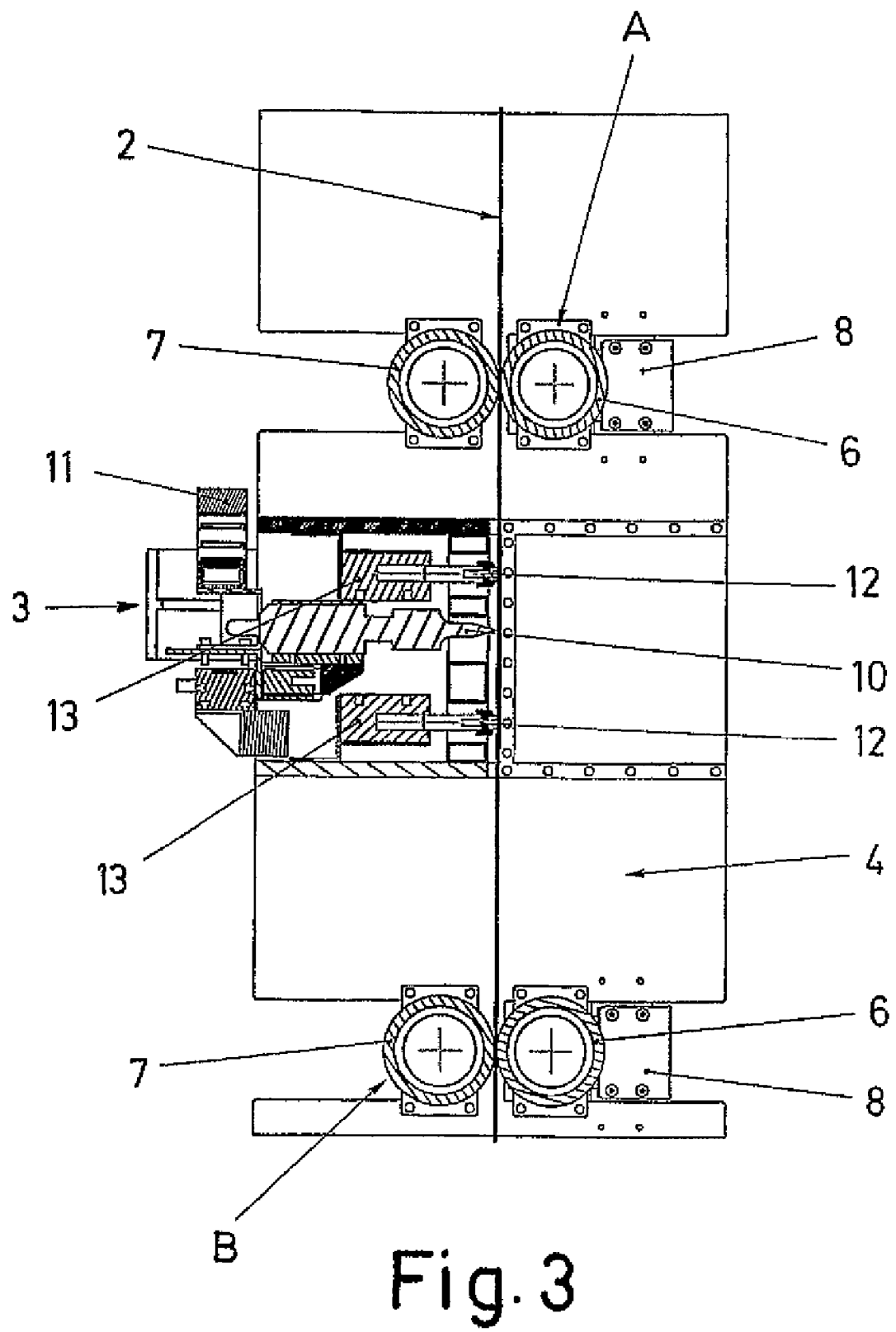
FIG. 3 shows a detailed cross section of the cutting zone of the object of the invention.
Figure 4:
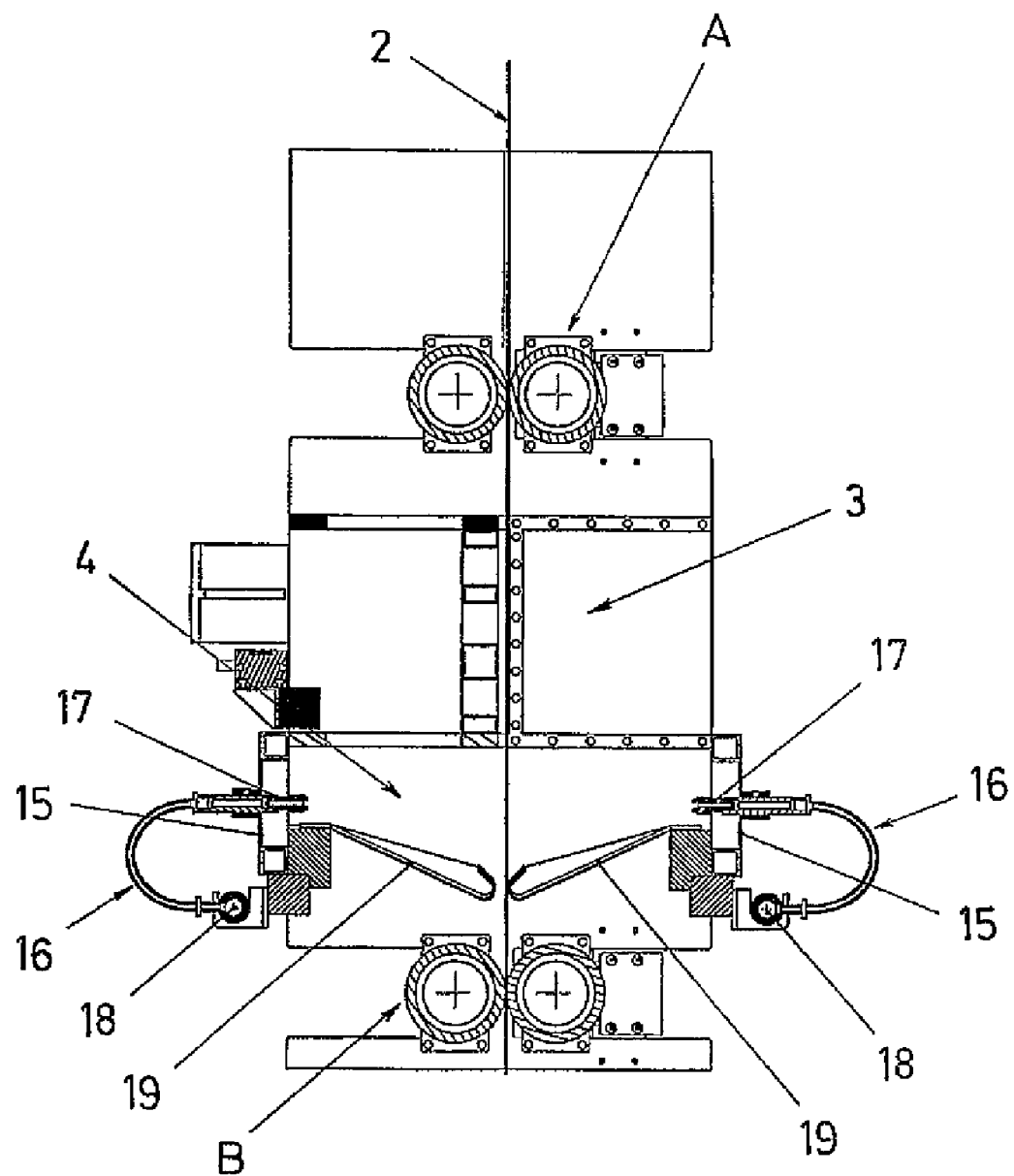
FIG. 4 shows a detailed cross section of the impregnation zone of the head.
Figure 5:
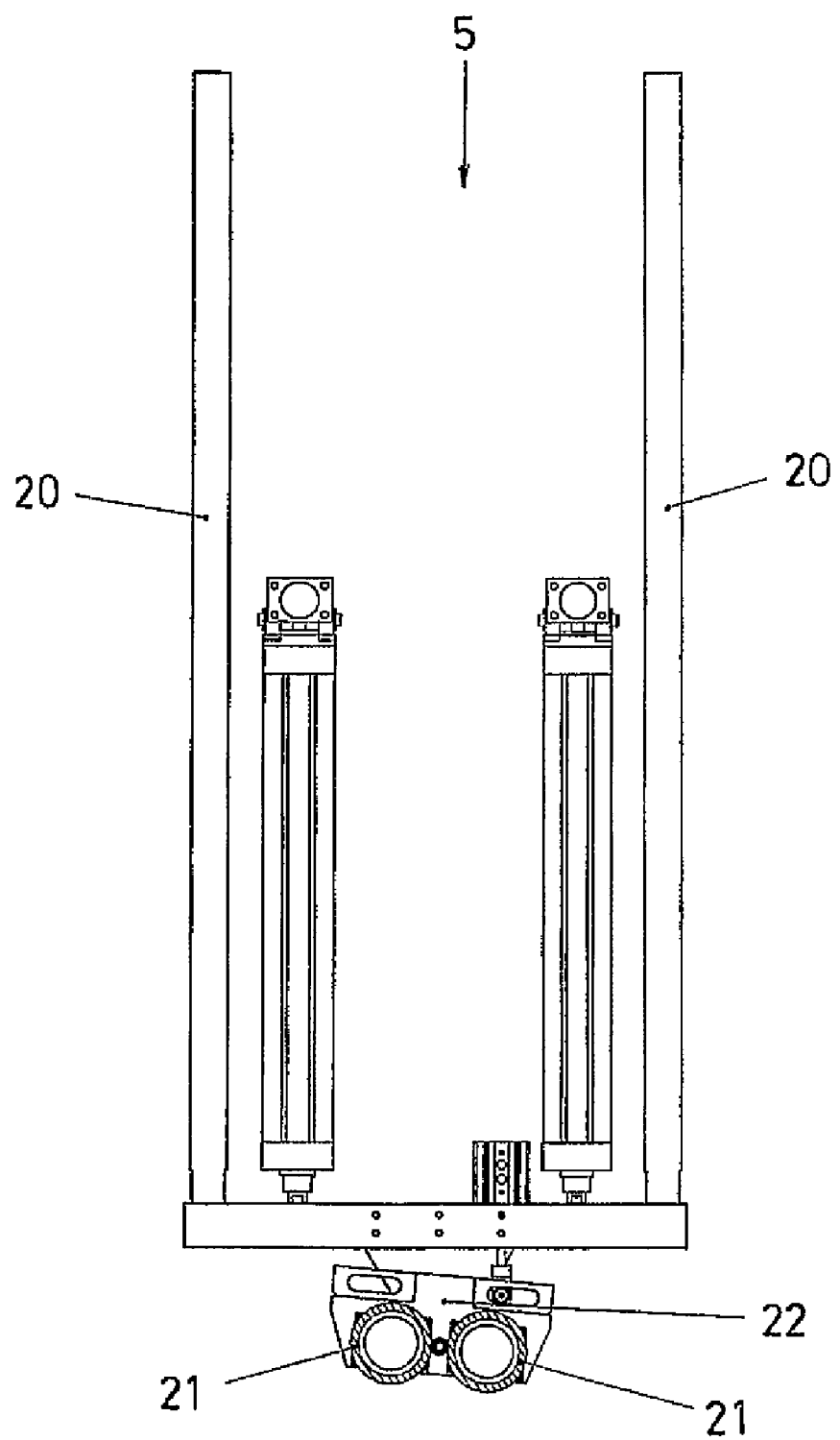
FIG. 5 shows a detailed section of the positioning zone of the head.

According to the present invention, a head (1) for the positioning of fibre blankets (2) in the manufacture of all types of parts, particularly in the manufacture of large structural parts, is proposed. The head (1) allows performing an automated process, gaining in quickness, precision, quality and homogeneity compared to conventional manual solutions.

The head (1) comprises an impregnation zone (4) in which the blanket (2) is impregnated with the resin necessary for the application thereof, a positioning zone (5) for positioning the fibre blankets on the surface of the mould or mandrel and a cutting zone (3) which allows cutting the blanket (2) at the ends of the extensions of the blanket (2) once positioned.

The head (1) furthermore incorporates individual sets of rollers (A and B) that convey and control the tension of the fibre blanket (2) at different points of the path from the feeding thereof in the head (1) to its exit towards the positioning zone on the corresponding surface of the mould or mandrel.

The two sets (A) and (B) of rollers are located before and after the cutting zone (3) and the impregnation zone (4). Each set (A) or (B) is formed by two facing rollers (6 and 7), in which the roller (6) is coupled to a pushing cylinder (8), whereas the other roller (7) is a driving roller and has for that purpose a motor (9) with speed control.

The set of rollers (6 and 7) located at the upper part and identified as (A) conveys the blanket (2) towards the cutting zone (3) and impregnation zone (4); whereas the set of rollers (6 and 7) located at the lower part and identified as (B) maintains the suitable tension in the blanket (2). These sets of rollers (A and B) thus allow regulating the speed of the fibre blanket (2) in its travel towards the positioning zone (5) at the operator's will.

The cutting zone (3) includes a cutting tool (10), such as for example an alternating or rotating blade system, an ultrasound cutting system or a similar solution, which moves in a transverse direction as a result of a linear movement mechanism (11).

Elements for immobilizing the blanket (2) are arranged in front of and behind this cutting tool (10), which elements are formed by hold-down plates (12) coupled to pushing cylinders (13) which press the blanket (2) against a fixed structure (14), immobilizing it to perform the cutting; such that these hold-down plates (12) occupy an advance position when the cutting tool (10) is operating and a retreat position when it is at rest. The fixed structure (14) incorporates the corresponding part fulfilling the functions of a dolly, for the cutting tool (10).

The impregnation zone (4) consists of a chamber provided with covers (15) in its side walls and has impregnating units (16) the nozzles (17) of which are oriented towards the zone through which the blanket (2) passes. These nozzles (17) are connected to groups of pumps (18) supplying a resin and a catalyst to impregnate the blanket (2) by means of projection through the nozzles (17). The resin and the catalyst are mixed and homogenized in their corresponding mixer.

Trays (19) with a draining system are located in the lower part of the aforementioned chamber. These trays (19) have a certain inclination with respect to the horizontal plane and their function is to collect the excess resin and catalyst projected on the blanket (2).

These trays (19) are accessed through the side covers (15) of the chamber, the cleaning of the head (1) thus being facilitated.

In the positioning zone (5) of the fibre blanket (2), the head (1) incorporates at least one roller (21), by means of which a pressure of the fibre blanket (2) is exerted on the application surface, this roller (21) having for that purpose pushing cylinders (20) acting on the ends thereof. The height of said pressure roller (21) and the force exerted by it during the positioning of the blanket (2) on the surface of the mould or mandrel can thus be regulated.

According to a possible alternative practical embodiment, it is envisaged that there are two pressure rollers (21) assembled on a rocker (22); such that, depending on the position occupied by this rocker (22), one or the other of these two rollers (21) acts. Thus, when the head (1) moves in the advance direction, one of the rollers (21) acts and, upon moving backwards, the other one acts, allowing the positioning of the fibre blanket (2) both in the advance and in the retreat of the head (1). The change from one roller to the other takes place automatically, through an external control, without needing an intervention of the operator.

In relation to the inlet of the head (1), the arrangement of a reel-holder (not depicted since it is a conventional means in the application of blankets or sheets) having a rotating drive geared motor is envisaged, such that at least one reel for supplying the fibre blanket (2) is incorporated in said reel-holder.

To control the supply of the fibre blanket (2) from the reel-holder to the head (1), such that the tension of the fibre blanket (2) is maintained constant, the incorporation in the reel-holder of a system for measuring the diameter of the reel for supplying the blanket (2) and a control of the number of revolutions of the unwinding motor is envisaged, although any other conventional control means performing the same function could be used.

The invention claimed is:

1. A head for the automatic positioning of fibre blankets, comprising:
    an impregnation zone (4) in which the fibre blanket (2) to be positioned is impregnated with a resin and a catalyst necessary for the application thereof;
    a positioning zone (5) for positioning the fibre blanket (2) on a corresponding surface of a mould or mandrel;
    a cutting zone (3) which allows cutting the fibre blanket (2);
    upper and lower sets of driving and pressure rollers (A and B) that convey the fibre blanket (2) and maintain a suitable tension thereof at different points of a path for the fibre blanket, from feeding thereof into the head to the positioning zone (5); and
    elements for immobilizing the fibre blanket (2) arranged in front of and behind a cutting tool (10), which elements are formed by hold-down plates (12) coupled to pushing cylinders (13) which press the fibre blanket (2) against a corresponding fixed structure (14), immobilizing the fibre blanket to perform the cutting, said hold-down plates (12) occupying an advance position when the cutting tool (10) is operating and a retreat position when the cutting tool is at rest.

2. The head for the automatic positioning of fibre blankets according to claim 1, wherein the cutting zone (3) and impregnation zone (4) are located contiguously and the upper and lower sets of driving and pressure rollers (A and B) are respectively located before and after the cutting zone (3) and impregnation zone (4).

3. The head for the automatic positioning of fibre blankets according to claim 1, wherein the upper and lower sets of driving and pressure rollers (A and B) are each formed by two facing rollers (6 and 7), wherein the roller (6) is coupled to a pushing cylinder (8), whereas the roller (7) is a driving roller and conductor and has for that purpose a motor (9) with speed control to regulate the speed of the fibre blanket (2) in its travel towards the positioning zone (5).

4. The head for the automatic positioning of fibre blankets according to claim 1, wherein the cutting zone (3) includes a cutting tool (10) which moves in a transverse direction by means of a linear movement mechanism (11).

5. The head for the automatic positioning of fibre blankets according to claim 1, wherein the impregnation zone (4) comprises: a chamber provided with side covers (15) and impregnating units (16), the impregnating units (16) comprising nozzles (17) which are oriented to project the resin and the catalyst onto the fibre blanket, said nozzles (17) being connected to groups of pumps (18) supplying the resin and the catalyst to impregnate the fibre blanket (2).

6. The head for the automatic positioning of fibre blankets according to claim 1, wherein trays (19) with their corresponding drain are arranged in a lower part of a chamber of the impregnation zone (4); these trays (19) are placed with a certain inclination with respect to the horizontal plane and excess resin and catalyst projected on the blanket (2) are collected in them.

7. The head for the automatic positioning of fibre blankets according to claim 1, wherein the positioning zone (5) comprises at least one pressure roller (21), by means of which a pressure is exerted on the fibre blanket (2), the pressure roller (21) having pushing cylinders (20) acting on the ends thereof to regulate its height and the force of the pressure on the blanket (2).

8. The head for the automatic positioning of fibre blankets according to claim 1, wherein the positioning zone (5) comprises two pressure rollers (21) assembled on a rocker (22) with external control, such that, depending on the position occupied by said rocker (22), one or the other of these two rollers (21) presses on the blanket (2); such that in the movement of the head (1) in the advance direction one roller (21) presses and in the retreat direction the other roller (21) acts.

\* \* \* \* \*